United States Patent [19]

Castegnier et al.

[11] Patent Number: 5,750,593
[45] Date of Patent: May 12, 1998

[54] STABILIZED ELECTROCOAGULATION PRINTING INK

[75] Inventors: Adrien Castegnier, Outremont; Normand Lepine, Pointe-aux-Trembles, both of Canada

[73] Assignee: Elcorsy Technology Inc., Saint-Laurent, Canada

[21] Appl. No.: 376,245

[22] Filed: Jan. 23, 1995

[51] Int. Cl.$^6$ .................................... C09D 11/02
[52] U.S. Cl. ................... 523/161; 524/239; 524/320; 524/435; 106/20 D; 260/DIG. 38
[58] Field of Search .............. 523/161; 524/239, 524/320, 435; 106/20 D; 260/DIG. 38

[56] References Cited

U.S. PATENT DOCUMENTS

| | | | |
|---|---|---|---|
| 4,116,896 | 9/1978 | Garrett et al. | 524/43 |
| 4,661,222 | 4/1987 | Castegnier | 204/180.9 |
| 4,895,629 | 1/1990 | Castegnier et al. | 204/180.9 |
| 5,188,664 | 2/1993 | Adamic et al. | 106/22 R |

OTHER PUBLICATIONS

N.D. Tomashov and G.P. Chernova, Passivity and Protection of Metals against Corrosion, 1967, pp. 42–43.
N. Sato and K. Hashimoto, Corrosion Science, vol. 31, 1989, pp. 13–15.
U.R. Evans, Corrosion and Oxidation of Metals, Second Supplementary vol., pp. 160–161.
W.L.K. Schwoyer, Polyelectrolytes for Water and Wastewater Treatment, 1986, pp. 214–218.
R.L. Davidson, Handbook of Water–Soluble Gums and Resins, 1980, pp. 16–3.

*Primary Examiner*—Paul R. Michl
*Assistant Examiner*—John J. Guarriello
*Attorney, Agent, or Firm*—Foley & Lardner

[57] ABSTRACT

A stabilized electrocoagulation printing ink comprises a liquid colloidal dispersion containing an electrolytically coagulable colloid, a dispersing medium, a soluble electrolyte, a coloring agent and a sequestering agent for completing metal ions generated during electrocoagulation printing. The sequestering agent is present in an amount to prevent the metal ions from causing the colloid to undergo undesirable cross-linking, without adversely affecting electrocoagulation of the colloid.

53 Claims, No Drawings

STABILIZED ELECTROCOAGULATION PRINTING INK

BACKGROUND OF THE INVENTION

The present invention pertains to improvements in the field of electrocoagulation printing. More particularly, the invention relates to a method of preventing an electrocoagulation printing ink from undergoing an undesirable increase in viscosity during electrocoagulation, as well as to a stabilized electrocoagulation printing ink.

In U.S. Pat. No. 4,895,629 of Jan. 23, 1990, Applicant has described a high-speed electrocoagulation printing method and apparatus in which use is made of a positive electrode in the form of a revolving cylinder having a passivated surface onto which dots of colored, coagulated colloid representative of an image are produced. These dots of colored, coagulated colloid are thereafter contacted with a substrate such as paper to cause transfer of the colored, coagulated colloid onto the substrate and thereby imprint the substrate with the image. As explained in this patent, the positive electrode is coated with a dispersion containing an olefinic substance and a metal oxide prior to electrical energization of the negative electrodes in order to weaken the adherence of the dots of coagulated colloid to the positive electrode and also to prevent an uncontrolled corrosion of the positive electrode. In addition, gas generated as a result of electrolysis upon energizing the negative electrodes is consumed by reaction with the olefinic substance so that there is no gas accumulation between the negative and positive electrodes.

The dispersion containing the olefinic substance and the metal oxide is applied onto the surface of the positive electrode in a manner so as to form on the electrode surface micro-droplets of olefinic substance containing the metal oxide. As described in the aforementioned patent, this may be achieved by means of a device comprising a rotatable brush provided with a plurality of radially extending horse-hair bristles having extremities contacting the electrode surface, and a distribution roller arranged in spaced-apart parallel relation to the brush such as to contact the bristles thereof at their extremities. The distribution roller has a plurality of peripheral longitudinally extending grooves and is partially immersed in a bath containing the dispersion. As the distribution roller rotates in the dispersion, the grooves are filled with the dispersion which is thus transferred to the bristles to coat the extremities thereof. Rotation of the brush, on the other hand, causes the coated bristles to transfer the dispersion onto the surface of the positive electrode and thereby form the desired micro-droplets of olefinic substance containing the metal oxide. Instead of a brush, use can be made of a roller provided with a plurality of radially extending strips of chamois leather adapted to contact the electrode surface, the strips being coated in the same manner as the bristles. Rotation of such a roller causes the coated strips to impinge upon the surface of the positive electrode such as to transfer thereon the dispersion and thereby form the desired micro-droplets of olefinic substance containing the metal oxide.

The electrocoagulation printing ink which is used to fill the gap defined between the positive and negative electrodes consists essentially of a liquid colloidal dispersion containing an electrolytically coagulable colloid, a dispersing medium, a soluble electrolyte and a coloring agent. N. D. Tomashov et al and N. Sato et al have reported in Passivity and Protection of Metals against Corrosion, 1967, pages 42–43 and in Corrosion Science, Vol. 31, 1989, pages 13–15, respectively, that a breakdown of passive oxide films occurs in the presence of electrolyte anions, such as $Cl^-$, $Br^-$ and $I^-$, there being a gradual oxygen displacement from the passive film by the halide anions and a displacement of adsorbed oxygen from the metal surface by the halide anions. Ulick R. Evans in Corrosion and Oxidation of Metals, Second Supplementary Volume, pages 160–161, has noted that the velocity of passive film breakdown, once started, increases explosively in the presence of an applied electric field. There is thus formation of a soluble metal halide at the metal surface. In other words, a local dissolution of the passive oxide film occurs at the breakdown sites, which releases metal ions into the electrolyte solution. Where a positive electrode made of stainless steel or aluminum is utilized in Applicant's electrocoagulation printing method, dissolution of the passive oxide film on such an electrode generates $Fe^{3+}$ or $Al^{3+}$ ions. These trivalent ions then initiate coagulation of the colloid, as described by William L. K. Schwoyer in Polyelectrolytes for Water and Wastewater Treatment, 1986, pages 214–218.

In Applicant's electrocoagulation printing method, the trivalent metal ions which are released from the positive electrode surface therefore play a major role in coagulating the colloid. Metal ions such as the trivalent ions $Fe^{3+}$ and $Al^{3+}$, on the other hand, have been reported by Robert L. Davidson in Handbook of Water-Soluble Gums and Resins, 1980, page 16-3, as being very efficient bridging agents for cross-linking colloids, particularly polyacrylamides. Such a cross-linking may account for the sharp increase in viscosity which Applicant's ink undergoes during the electrocoagulation printing method and which takes place after only several minutes of operation, resulting in gelation of the ink. Indeed, Applicant has found through analysis of various ink samples taken at different printing stages and time intervals that the ink contains iron or aluminum ions depending on whether the positive electrode used is made of stainless steel or aluminum and that the concentration of these metal ions increases in time during electrocoagulation printing. These metal ions are believed to be generated by the friction of the aforementioned bristles or chamois leather strips on the surface of the positive electrode as well as by the friction of the cleaning brushes used for cleaning the latter. Minor leaks from the system used for removing non-coagulated ink from the positive electrode surface after electrocoagulation of the colloid has taken place, which contains iron or aluminum ions released from the positive electrode surface but not consumed by coagulation of the colloid, also contaminate the ink. In addition, the paper onto which the dots of coagulated colloid are transferred contains metal ion contaminants and these are released onto the positive electrode surface upon contact of the paper with the latter. All these metal ion contaminants cross-link the colloid contained in the ink, resulting in a viscosity increase leading to an ultimate gelation of the ink and, consequently, shutdown of the printing apparatus.

SUMMARY OF THE INVENTION

It is therefore an object of the present invention to overcome the above drawbacks and to provide a method of preventing an electrocoagulation ink from undergoing an undesirable increase in viscosity during electrocoagulation printing.

It is another object of the invention to provide a stabilized electrocoagulation ink.

According to one aspect of the invention, there is thus provided a method of preventing an electrocoagulation printing ink from undergoing an undesirable increase in viscosity during electrocoagulation printing, the electrocoagulation printing ink consisting essentially of a liquid colloidal dispersion containing an electrolytically coagulable colloid, a dispersing medium, a soluble electrolyte and a coloring agent. The method of the invention comprises the step of admixing with the ink a sequestering agent for complexing metal ions generated during the electrocoagulation printing, the sequestering agent being added in an amount to prevent the metal ions from causing the colloid to undergo undesirable cross-linking, without adversely affecting electrocoagulation of the colloid.

According to another aspect of the invention, there is also provided a stabilized electrocoagulation printing ink consisting essentially of a liquid colloidal dispersion containing an electrolytically coagulable colloid, a dispersing medium, a soluble electrolyte, a coloring agent and a sequestering agent for complexing metal ions generated during electrocoagulation printing. The sequestering agent is present in an amount to prevent the metal ions from causing the colloid to undergo undesirable cross-linking, without adversely affecting electrocoagulation of the colloid.

Applicant has found quite unexpectedly that the viscosity of an electrocoagulation printing ink can be efficiently controlled during electrocoagulation printing by admixing a sequestering agent with the ink. The amount of sequestering agent necessary to prevent the metal ions generated during the electrocoagulation printing from causing an undesirable cross-linking of the colloid depends on the sequestering agent used as well as on the concentration of metal ions which causes an undesirable cross-linking of the colloid and which, in turn, depends on the type of colloid contained in the ink. The amount of sequestering agent added, on the other hand, should not adversely affect the electrocoagulation of the colloid since a too large quantity may also complex the metal ions which are released from the positive electrode surface during passive film breakdown and which are essential to the coagulation of the colloid. Applicant has found that, for most colloids, when the concentration of ferric ions which cause the colloid to cross-link is generally above 25 ppm, the ink is too viscous for proper working and, at about 140 ppm, there is gelation of the ink. Thus, according to a preferred embodiment of the invention, the sequestering agent is added in an amount such that no more than about 20 ppm, and preferably no more than about 15 ppm of ferric ions cause the colloid to cross-link. Therefore, the concentration of complexed metal ions in the ink may be quite high and reach several hundred ppm, provided that in Applicant's preferred embodiment, no more than about 20 ppm of ferric ions cross-link the colloid.

The expression "electrocoagulation printing" as used herein refers to the entire printing process by which an image is reproduced by electrocoagulation of an electrolytically electrocoagulable colloid and the image thus reproduced is transferred onto a substrate, such as paper. The entire printing process thus includes the steps of (a) cleaning the positive electrode surface, (b) coating the latter with an olefinic substance and a metal oxide, (c) filling the electrode gap with the aforementioned colloidal dispersion, (d) electrically energizing selected negative electrodes to form on the olefin and metal oxide-coated positive electrode surface a series of dots of colored, coagulated colloid representative of a desired image, (e) removing any remaining non-coagulated colloid from the positive electrode surface and (f) contacting the dots of colored, coagulated colloid with a substrate to cause transfer of the colored, coagulated colloid onto the substrate.

The expression "electrocoagulation of the colloid" as used herein refers only to step (d) of the above process, which involves breakdown of the passive oxide film on the positive electrode surface, release of metal ions from the positive electrode surface, coagulation of the colloid and formation of dots of coagulated colloid on the positive electrode surface.

Applicant has also found quite unexpectedly that the addition of a sequestering agent to an electrocoagulation printing ink which has undergone gelation during electrocoagulation printing causes cleaving of the cross-linking bridges formed by the metal ions and complexing of the metal ions, resulting in a liquefaction of the gelled ink. The sequestering agent can thus be used in accordance with the invention not only as a preventive means, but also as a curative means.

The present invention therefore also provides, in a further aspect thereof, a method of liquefying an electrocoagulation printing ink which has undergone gelation during electrocoagulation printing, the electrocoagulation printing ink consisting essentially of a liquid colloidal dispersion in a gel state containing an electrolytically coagulable colloid, a dispersing medium, a soluble electrolyte and a coloring agent and wherein said colloid is cross-linked by metal ions generated during the electrocoagulation printing. The method comprises the step of admixing with the gelled ink a sequestering agent for cleaving cross-linking bridges formed by the metal ions and complexing the metal ions to thereby liquefy the gelled ink, the sequestering agent being added in an amount to prevent the metal ions from causing the colloid to undergo undesirable cross-linking, without adversely affecting electrocoagulation of the colloid.

DESCRIPTION OF PREFERRED EMBODIMENTS

The sequestering agent used is preferably a chelating agent which forms ring structures incorporating the metal ions as central metal atoms. Such a ring formation increases the stability of the metal-chelating agent bonding. A preferred class of chelating agents comprises polyaminocarboxylic acids and their salts which are sold by Ciba-Geigy Corporation under the trade marks SEQUESTRENE and CHEL. Examples of such polyaminocarboxylic acids include ethylenediaminetetraacetic acid (EDTA), diethylenetriaminepentaacetic acid (DTPA), ethylene-bis (oxyethylenenitrilo)tetraacetic acid (EGTA) and hydroxyethylethylenediaminetriacetic acid (HEDTA). These chelating agents are preferably used in an amount of about 0.01 to about 0.15% by weight, based on the total weight of the ink.

Particularly preferred chelating agents are EDTA and its salts which are readily available at low cost. Where the ink is to be used as a working ink for approximately one hour of printing or as a starting ink for the starting of a continuous printing lasting several hours with intermittent additions of replenishing ink, the EDTA or salt thereof is preferably used in an amount of about 0.01 to about 0.09% by weight, and more preferably in an amount of about 0.03% by weight in the case of a working ink and about 0.02% by weight in the case of a starting ink, based on the total weight of the ink. In the case of a replenishing ink, the EDTA or salt thereof is preferably used in an amount of about 0.02 to about 0.1% by weight and more preferably in an amount of about 0.06% by weight, based on the total weight of the ink.

The colloid generally used is a linear colloid of high molecular weight, that is, one having a molecular weight comprised between about 10,000 and about 1,000,000, preferably between 100,000 and 600,000. Examples of suitable colloids include natural polymers such as albumin, gelatin, casein and agar, and synthetic polymers such as polyacrylic acid, polyacrylamide and polyvinyl alcohol. A particularly preferred colloid is an anionic copolymer of acrylamide and acrylic acid having a molecular weight of about 250,000 and sold by Cyanamid Inc. under the trade mark ACCOSTRENGTH 86. The colloid is preferably used in an amount of about 6.5 to about 12% by weight, and more preferably in an amount of about 7% by weight, based on the total weight of the ink. Water is preferably used as the medium for dispersing the colloid to provide the desired colloidal dispersion.

The ink also contains a soluble electrolyte and a coloring agent. Preferred electrolytes for causing the desired breakdown of the passive oxide film on the positive electrode surface include alkali metal halides and alkaline earth metal halides, such as lithium chloride, sodium chloride, potassium chloride and calcium chloride. The electrolyte is preferably used in an amount of about 6.5 to about 9% by weight, based on the total weight of the ink. The coloring agent can be a dye or a pigment. Examples of suitable dyes which may be used to color the colloid are the water soluble dyes available from HOECHST such as Duasyn Acid Black for coloring in black and Duasyn Acid Blue for coloring in cyan, or those available from RIEDEL-DEHAEN such as Anti-Halo Dye Blue T. Pina for coloring in cyan, Anti-Halo Dye AC Magenta Extra V01 Pina for coloring in magenta and Anti-Halo Dye Oxonol Yellow N. Pina for coloring in yellow. When using a pigment as a coloring agent, use can be made of the pigments which are available from CABOT CORP. such as Carbon Black Monarck® 120 for coloring in black, or those available from HOECHST such as Hostaperm Blue B2G or B3G for coloring in cyan, Permanent Rubine F6B or L6B for coloring in magenta and Permanent Yellow DGR or DHG for coloring in yellow. A dispersing agent is added for uniformly dispersing the pigment into the dispersion. Examples of suitable dispersing agents include the anionic dispersing agent sold by ICI Canada Inc. under the trade mark SOLSPERSE 20000. The pigment is preferably used in an amount of about 6.5 to about 12% by weight, and the dispersing agent in an amount of about 0.4 to about 6% by weight, based on the total weight of the ink.

The ink according to the invention preferably includes a biocidal agent for preventing the growth of fungii, molds and the like. A preferred biocidal agent is the one sold by Gray Products under the trade mark PARMETOL K-50. The biocidal agent is preferably used in an amount of about 0.1 to about 1% by weight, based on the total weight of the ink.

A preferred ink formulation for use as either a working or starting ink consists essentially of an aqueous colloidal dispersion having a pH of about 4 to about 5 and containing about 60 to about 80% by weight of water, about 6.5 to about 12% by weight of an anionic acrylamide polymer, about 6.5 to about 9% by weight of an alkali metal chloride, about 6.5 to about 12% by weight of a pigment, about 0.4 to about 6% by weight of an anionic dispersing agent, about 0.01 to about 0.09% by weight of ethylenediaminetetraacetic acid or a salt thereof and about 0.1 to about 1% by weight of a biocidal agent, based on the total weight of the ink. A preferred ink formulation for use as a replenishing ink, on the other hand, consists essentially of an aqueous colloidal dispersion having a pH of about 4 to about 5 and containing about 60 to about 80% by weight of water, about 6.5 to about 12% by weight of an anionic acrylamide polymer, about 6.5 to about 9% by weight of an alkali metal chloride, about 6.5 to about 12% by weight of a pigment, about 0.4 to about 6% by weight of an anionic dispersing agent, about 0.02 to about 0.1% by weight of ethylenediaminetetraacetic acid or a salt thereof and about 0.1 to about 1% of a biocidal agent, based on the total weight of the ink.

The present invention enables one to efficiently control the ink viscosity during electrocoagulation printing and thus to successfully carry out the electrocoagulation printing without interruption.

The following non-limiting examples illustrate the invention.

EXAMPLE 1

An ink composition useful as a working ink was prepared from the following ingredients:

| | |
|---|---|
| Demineralized water | 69.81wt.% |
| Pigment | 10.47wt.% |
| Anionic dispersing agent sold under the trade mark SOLSPERSE 20000 | 4.19wt.% |
| Anionic acrylamide polymer sold under the trade mark ACCOSTRENGTH 86 | 6.98wt.% |
| Potassium chloride | 8.38wt.% |
| Disodium EDTA dihydrate sold under the trade mark SEQUESTRENE NA2 | 0.03wt.% |
| Biocidal agent sold under the trade mark PARMETOL K-50 | 0.14wt.% |
| | 100.00wt.% |

The pigment was first dispersed into the water with the dispersing agent, using a ball grinder. The acrylamide polymer was then added to the resulting dispersion, followed by the addition of the potassium chloride and the biocidal agent. The chelating agent SEQUESTRENE NA2 was thereafter admixed. The aqueous colloidal dispersion thus obtained had a pH of about 4.5.

The above working ink was used in an electrocoagulation printing apparatus of the type described in Applicant's aforementioned U.S. Pat. No. 4,895,629. The viscosity of the ink during electrocoagulation printing was about 360 cp and remained substantially constant for a period of about one hour.

EXAMPLE 2

An ink composition useful as a starting ink was prepared from the following ingredients:

| | |
|---|---|
| Demineralized water | 69.82wt.% |
| Pigment | 10.47wt.% |
| Anionic dispersing agent sold under the trade mark SOLSPERSE 20000 | 4.19wt.% |
| Anionic acrylamide polymer sold under the trade mark ACCOSTRENGTH 86 | 6.98wt.% |
| Potassium chloride | 8.38wt.% |
| Disodium EDTA dihydrate sold under the trade mark SEQUESTRENE NA2 | 0.02wt.% |
| Biocidal agent sold under the trade mark PARMETOL K-50 | 0.14wt.% |
| | 100.00wt.% |

An ink composition useful as a replenishing ink was also prepared from the following ingredients:

| | |
|---|---|
| Demineralized water | 69.99wt.% |
| Pigment | 10.40wt.% |
| Anionic dispersing agent sold under the trade mark SOLSPERSE 20000 | 4.16wt.% |
| Anionic acrylamide polymer sold under the trade mark ACCOSTRENGTH 86 | 6.93wt.% |
| Potassium chloride | 8.32wt.% |
| Disodium EDTA dihydrate sold under the trade mark SEQUESTRENE NA2 | 0.06wt.% |
| Biocidal agent sold under the trade mark PARMETOL K-50 | 0.14wt.% |
| | 100.00wt.% |

Both the starting ink and the replenishing ink were prepared in the same manner as the working ink of Example 1.

The above starting ink was used to start a continuous printing lasting several hours, in the same electrocoagulation printing apparatus as in Example 1. As the level of the ink in the ink feeder diminished, the ink was replenished with the above replenishing ink to maintain a constant ink level. The ink viscosity was about 350 cp and remained substantially constant during the entire printing.

EXAMPLE 3

Example 1 was repeated with the exception that the chelating agent in the working ink was EDTA sold under the trade mark SEQUESTRENE AA. Essentially the same results were obtained.

EXAMPLE 4

Example 2 was repeated with the exception that the chelating agent in both the starting ink and replenishing ink was EDTA sold under the trade mark SEQUESTRENE AA. Essentially the same results were obtained.

EXAMPLE 5

Example 1 was repeated with the exception that the chelating agent in the working ink was DTPA sold under the trade mark CHEL DTPA. Essentially the same results were obtained.

EXAMPLE 6

Example 2 was repeated with the exception that the chelating agent in both the starting ink and replenishing ink was DTPA sold under the trade mark CHEL DTPA. Essentially the same results were obtained.

EXAMPLE 7

Example 1 was repeated with the exception that the chelating agent in the working ink was EGTA sold by American Chemicals Ltd. under product No E-1475. Essentially the same results were obtained.

EXAMPLE 8

Example 2 was repeated with the exception that the chelating agent in both the starting ink and replenishing ink was EGTA sold by American Chemicals Ltd. under Product No E-1475. Essentially the same results were obtained.

EXAMPLE 9

A working ink of the same composition as in Example 1, but without any chelating agent, was allowed to undergo gelation during electrocoagulation printing. The ink viscosity increased to about 800 cp during the first 15 minutes of printing and underwent complete gelation within the next 30 minutes.

100 mg of disodium EDTA dihydrate sold under the trade mark SEQUESTRENE NA2 were admixed with 100 g of the gelled ink. Liquefaction of the gelled ink gradually took place and was completed after about 12 hours. The viscosity of the liquefied ink was about 355 cp.

We claim:

1. A stabilized electrocoagulation printing ink consisting essentially of a liquid colloidal dispersion containing an electrolytically coagulable colloid, a dispersing medium, a soluble electrolyte, a coloring agent and a sequestering agent for complexing trivalent metal ions generated during electrocoagulation printing, said sequestering agent being present in an amount such that no more than about 20 ppm of trivalent metal ions cause said colloid to crosslink thereby preventing undesired crosslinking of the colloid without adversely affecting electrocoagulation of said colloid.

2. An ink as claimed in claim 1, wherein said trivalent ions are ferric ions.

3. An ink as claimed in claim 2, wherein said sequestering agent is present in an amount such that no more than about 15 ppm of ferric ions cause said colloid to cross-link.

4. An ink as claimed in claim 1, wherein said sequestering agent is a chelating agent selected from the group consisting of polyaminocarboxylic acids and salts thereof.

5. An ink as claimed in claim 4, wherein said chelating agent is a polyaminocarboxylic acid selected from the group consisting of ethylenediaminetetraacetic acid, diethylenetriaminepentaacetic acid, ethylene-bis(oxyethylenenitrilo) tetraacetic acid and hydroxyethylethylenediaminetriacetic acid, or a salt thereof.

6. An ink as claimed in claim 5, wherein said chelating agent is present in an amount of about 0.01 to about 0.15% by weight, based on the total weight of the ink.

7. An ink as claimed in claim 5, wherein said chelating agent is ethylenediaminetetraacetic acid or a salt thereof.

8. An ink as claimed in claim 7, wherein said chelating agent is present in an amount of about 0.01 to about 0.09% by weight, based on the total weight of the ink.

9. An ink as claimed in claim 8, wherein the amount of said chelating agent is about 0.02% by weight.

10. An ink as claimed in claim 8, wherein the amount of said chelating agent is about 0.03% by weight.

11. An ink as claimed in claim 7, wherein said chelating agent is present in an amount of about 0.02 to about 0.1% by weight, based on the total weight of the ink.

12. An ink as claimed in claim 11, wherein the amount of said chelating agent is about 0.06% by weight.

13. An ink as claimed in claim 1, wherein said colloid is a linear colloid having a molecular weight ranging from about 100,000 to about 600,000.

14. An ink as claimed in claim 13, wherein said colloid is a natural polymer selected from the group consisting of albumin, gelatin, casein and agar.

15. An ink as claimed in claim 13, wherein said colloid is a synthetic polymer selected from the group consisting of polyacrylic acid, polyacrylamide and polyvinyl alcohol.

16. An ink as claimed in claim 15, wherein said synthetic polymer is a polyacrylamide.

17. An ink as claimed in claim 16, wherein said polyacrylamide is present in an amount of about 6.5 to about 12% by weight, based on the total weight of the ink.

18. An ink as claimed in claim 17, wherein the amount of polyacrylamide is about 7% by weight.

19. An ink as claimed in claim 1, wherein said dispersing medium is water and said electrolyte is selected from the group consisting of alkali metal halides and alkaline earth metal halides.

20. An ink as claimed in claim 19, wherein said electrolyte is present in an amount of about 6.5 to about 9% by weight, based on the total weight of the ink.

21. An ink as claimed in claim 1, wherein said coloring agent is a pigment and wherein said colloidal dispersion further includes a dispersing agent for uniformly dispersing said pigment into said dispersion.

22. An ink as claimed in claim 21, wherein said pigment is present in an amount of about 6.5 to about 12% by weight, based on the total weight of the ink.

23. An ink as claimed in claim 21, wherein said dispersing agent is present in an amount of about 0.4 to about 6% by weight, based on the total weight of the ink.

24. An ink as claimed in claim 1, further including a biocidal agent.

25. An ink as claimed in claim 24, wherein said biocidal agent is present in an amount of about 0.1 to about 1% by weight, based on the total weight of the ink.

26. An ink as claimed in claim 1, wherein said trivalent ions are aluminum ions.

27. A method of preventing an electrocoagulation printing ink from undergoing an undesirable increase in viscosity during electrocoagulation printing, said electrocoagulation printing ink consisting essentially of a liquid colloidal dispersion containing an electrolytically coagulable colloid, a dispersing medium, a soluble electrolyte and a coloring agent, said method comprising the step of admixing with said ink a sequestering agent for complexing trivalent metal ions generated during said electrocoagulation printing, said sequestering agent being added in an amount to prevent said trivalent metal ions from causing said colloid to undergo undesirable crosslinking, without adversely affecting electrocoagulation of said colloid.

28. A method as claimed in claim 27, wherein said trivalent ions are aluminum or ferric ions.

29. A method as claimed in claim 28, wherein said metal ions are ferric ions and wherein said sequestering agent is added in an amount such that no more than about 20 ppm of ferric ions cause said colloid to cross-link.

30. A method as claimed in claim 29, wherein said sequestering agent is added in an amount such that no more than about 15 ppm of ferric ions cause said colloid to cross-link.

31. A method as claimed in claim 27, wherein said sequestering agent is a chelating agent selected from the group consisting of polyaminocarboxylic acids and salts thereof.

32. A method as claimed in claim 31, wherein said chelating agent is a polyaminocarboxylic acid selected from the group consisting of ethylenediaminetetraacetic acid, diethylenetriaminepentaacetic acid, ethylene-bis (oxyethylenenitrilo)tetraacetic acid and hydroxyethylethylenediaminetriacetic acid, or a salt thereof.

33. A method as claimed in claim 32, wherein said chelating agent is added in an amount of about 0.01 to about 0.15% by weight, based on the total weight of the ink.

34. A method as claimed in claim 32, wherein said chelating agent is ethylenediaminetetraacetic acid or a salt thereof.

35. A method as claimed in claim 34, wherein said chelating agent is added in an amount of about 0.01 to about 0.09% by weight, based on the total weight of the ink.

36. A method as claimed in claim 35, wherein the amount of said chelating agent is about 0.02% by weight.

37. A method as claimed in claim 35, wherein the amount of said chelating agent is about 0.03% by weight.

38. A method as claimed in claim 34, wherein said chelating agent is added in an amount of about 0.02 to about 0.1% by weight, based on the total weight of the ink.

39. A method as claimed in claim 38, wherein the amount of said chelating agent is about 0.06% by weight.

40. A method of liquefying an electrocoagulation printing ink which has undergone gelation during electrocoagulation printing, said electrocoagulation printing ink consisting essentially of a liquid colloidal dispersion in a gel state containing an electrolytically coagulable colloid, a dispersing medium, a soluble electrolyte and a coloring agent and wherein said colloid is cross-linked by trivalent metal ions generated during said electrocoagulation printing, said method comprising the step of admixing with the gelled ink a sequestering agent for cleaving cross-linking bridges formed by said trivalent metal ions and complexing said trivalent metal ions to thereby liquefy said gelled ink, said sequestering agent being added in an amount to prevent said trivalent metal ions from causing said colloid to undergo undesirable cross-linking, without adversely affecting electrocoagulation of said colloid.

41. A method as claimed in claim 40, wherein said trivalent ions are aluminum or ferric ions.

42. A method as claimed in claim 41, wherein said metal ions are ferric ions and wherein said sequestering agent is added in an amount such that no more than about 20 ppm of ferric ions cause said colloid to cross-link.

43. A method as claimed in claim 42, wherein said sequestering agent is added in an amount such that no more than about 15 ppm of ferric ions cause said colloid to cross-link.

44. A method as claimed in claim 40, wherein said sequestering agent is a chelating agent selected from the group consisting of polyaminocarboxylic acids and salts thereof.

45. A method as claimed in claim 44, wherein said chelating agent is a polyaminocarboxylic acid selected from the group consisting of ethylenediaminetetraacetic acid, diethylenetriaminepentaacetic acid, ethylene-bis (oxyethylenenitrilo)tetraacetic acid and hydroxyethylethylenediaminetriacetic acid, or a salt thereof.

46. A method as claimed in claim 45, wherein said chelating agent is added in an amount of about 0.01 to about 0.15% by weight, based on the total weight of the ink.

47. A method as claimed in claim 45, wherein said chelating agent is ethylenediaminetetraacetic acid or a salt thereof.

48. A method as claimed in claim 47, wherein said chelating agent is added in an amount of about 0.02 to about 0.1% by weight, based on the total weight of the ink.

49. A stabilized electrocoagulation printing ink consisting essentially of an aqueous colloidal dispersion having a pH of about 4 to about 5 and containing about 60 to about 80% by weight of water, about 6.5 to about 12% by weight of an anionic acrylamide polymer, about 6.5 to about 9% by weight of an alkali metal chloride, about 6.5 to about 12% by weight of a pigment, about 0.4 to about 6% by weight of an anionic dispersing agent, about 0.01 to about 0.09% by weight of ethylenediaminetetraacetic acid or a salt thereof and about 0.1 to about 1% by weight of a biocidal agent, based on the total weight of the ink.

50. An ink as claimed in claim 49, wherein the amount of ethylenediaminetetraacetic acid or salt thereof is about 0.02% by weight.

51. An ink as claimed in claim 49, wherein the amount of ethylenediaminetetraacetic acid or salt thereof is about 0.03% by weight.

52. A stabilized electrocoagulation printing ink consisting essentially of an aqueous colloidal dispersion having a pH of about 4 to about 5 and containing about 60 to about 80% by weight of water, about 6.5 to about 12% by weight of an anionic acrylamide polymer, about 6.5 to about 9% by weight of an alkali metal chloride, about 6.5 to about 12% by weight of a pigment, about 0.4 to about 6% by weight of an anionic dispersing agent, about 0.02 to about 0.1% by weight of ethylenediaminetetraacetic acid or a salt thereof and about 0.1 to about 1% of a biocidal agent, based on the total weight of the ink.

53. An ink as claimed in claim 52, wherein the amount of ethylenediaminetetraacetic acid or salt thereof is about 0.06% by weight.

* * * * *